Patented Mar. 11, 1947

2,417,093

UNITED STATES PATENT OFFICE 2,417,093

SULFURIZED, MILLED, AND CURED POLYMER

William J. Sparks, Elizabeth, and Henry B. Kellog, Union City, N. J., assignors, by mesne assignments, to Jasco, Incorporated, a corporation of Louisiana No Drawing. Application September 6, 1941, Serial No. 409,906

7 Claims. (Cl. 260—79)

This invention relates to plastic, elastic, rubbery materials; relates particularly to high molecular weight synthetic polymers of an isoolefin, such as isobutylene, with a diolefin, such as butadiene, characterized by a relatively low iodine number; and relates especially to a sulfur chloride treatment in solution of a synthetic interpolymer of an isoolefin with a diolefin to yield a modified polymer which is curable with sulfur to produce a plastic, elastic, rubber-like substance having a high elongation, a definitely measurable elastic limit and a higher modulus than the untreated polymer.

It has been found possible to produce an interpolymer or copolymer of an isoolefin such as isobutylene with a diolefin, particularly a conjugated diolefin such as butadiene or isoprene or pentadiene or dimethyl butadiene by the use of a low temperature technique at temperatures ranging from −20 to −100° C. to −150° C. or lower, with a Friedel-Crafts type catalyst such as aluminum chloride or aluminum bromide in solution in a low freezing solvent such as ethyl or methyl chloride or carbon disulfide or other similar inert low freezing solvent for the active metal halide substance. The resultant polymer is composed to a major extent of polymerized isobutylene molecules with a minor amount of interpolymerized diolefin molecules, usually less than 5%, preferably less than 10%. The polymer is characterized by a relatively low iodine number, usually between 1 and 10, and preferably below 45, and a relatively high molecular weight, preferably above 15,000, or even above 25,000, up to about 100,000 to 150,000. This polymer is reactive with sulfur, especially in the presence of a sulfur compound of the thiuram type such as tetramethyl thiuram disulfide (Tuads) or other analogous substances such as dipentamethylene thiuram tetrasulfide (Tetrone A), selenium diethyl dithio carbamate (Ethyl Selenac), and zinc dibutyl dithio carbamate (Butyl Zimate), etc.

The sulfurization reaction is a curing procedure having a few points of similarity to the vulcanization of rubber in that it decreases the plasticity of the material and produces in it a definite elastic limit and a definite elongation at break, the tensile strength ranging from 2,000 to 5,000 lbs./sq. in. and the elongation ranging from 500% to 1200%, although under favorable conditions the upper value of the tensile strength can be substantially increased. The curing reaction preferably occurs at temperatures ranging from 145° C. to 180° C., preferably by the application of those temperatures for time intervals ranging from 10 minutes to 4 hours, depending upon the sulfurization aid, the character of the polymer, and the temperature.

It is now found, however, that by the procedure of the present invention, a very substantial increase in modulus, in flexure resistance and in abrasion resistance can be obtained, and also the material is more easily cured, especially in the presence of other substances which tend to interfere with the curing of the polymer as originally produced.

The present invention consists of a treatment of the olefin polymer in solution with a sulfur chloride such as sulfur monochloride and sulfur dichloride. This treatment does not cure or vulcanize the material, does not destroy its plasticity, and does not interfere with a subsequent curing operation. Accordingly, a further aspect of the invention is the combination of treatments applied to the polymer, including a sulfur chloride treatment and a compounding with sulfur together with a sulfurization aid, various pigments and loading agents and a subsequent curing by the application of heat into a fully cured and sulfurized material which has a markedly increased modulus, markedly increased abrasion resistance, and a markedly increased flexure resistance; the procedure giving a much greater ease of curing, as well as the capability of curing in the presence of natural rubber and other unsaturated substances.

Thus, an object of the invention is to modify the characteristics of an isoolefin-diolefin polymer by the application of a sulfur chloride to the polymer while in solution; a further object is to apply to an interpolymer of an isoolefin with a diolefin, a sulfur chloride treatment, and subsequently a curing treatment to improve the modulus, the abrasion resistance and flexure resistance of the polymer. Other objects and details of the invention will be apparent from the following description.

The polymer material of this invention is preferably prepared by the procedure shown in the co-pending application, Serial No. 182,252, filed December 29, 1937, now Patent No. 2,356,127, in the name of William J. Sparks and Robert M. Thomas. In outline, the procedure for preparing the polymer consists in preparing a mixture of an isoolefin such as isobutylene or other isoolefins having not more than about seven carbon atoms per molecule as shown in the above-mentioned patent in the proportion of from 70 to 99 parts with a diolefin in the proportion of 30 to 1 part; suitable diolefins being butadiene, isoprene, pentadiene, dimethyl butadiene, cyclopentadiene or other conjugated diolefins. The mixture of isobutylene and conjugated diolefin is then cooled to a relatively low temperature, preferably below $-20°$ C., and preferably by the application to the mixture of a refrigerant such as solid carbon dioxide, or ethylene (which is the preferred refrigerant-diluent), or such other diluent-refrigerants as liquid methane, especially in admixture with liquid propane or liquid ethane, or, under suitable conditions, external cooling may be used. In addition, various diluents may be used such as butane, ethyl or methyl chloride and the like. If solid carbon dioxide is used, it is preferably present in substantial excess, usually 2 or 3 times by weight of the amount of mixed olefins. To this mixture of olefins and diluent-refrigerant there is then added a solution of an active halide catalyst such as aluminum chloride, titanium chloride, or uranium chloride dissolved in an inert, low-freezing, solvent such as ethyl or methyl chloride or carbon disulfide or other similar low-freezing, non-complex forming solvent. The catalyst solution is preferably applied to the rapidly stirred olefin-containing mixture in the form of a fine mist or spray onto the rapidly agitated surface of the olefin-containing mixture. The polymerization proceeds rapidly to yield a slurry or mass of the polymer in the residual diluent-refrigerant.

The polymerization reaction is preferably continued until from 50% to 95% of the olefins present have reacted. When this stage of reaction is reached, the reaction is desirably quenched by mixing the polymerization material with a combined-oxygen-containing substance such as an alcohol, a ketone or an acid, or an alkaline agent such as caustic or carbonate solution or ammonia or other similar quenching agent. The polymer is then preferably brought up to room temperature and in so doing the diluent, the refrigerant, the catalyst solvent and the unreacted olefins are volatilized and the decomposition products of the active metal halide catalyst substance are removed by washing. This washing is conveniently conducted in a Werner-Pfleiderer type of kneading machine, but it may be conducted in the Banbury type of mill or on the open rolls or merely by prolonged soaking in a churn or other simple washing equipment. The polymer is then preferably dried and is then ready for the next step of the present invention.

Example 1

100 parts of the above described interpolymer of isobutylene with butadiene were cut into small fragments and submerged in 800 parts of petroleum naphtha. This mixture was allowed to stand until a homogeneous dispersion or solution of the polymer was obtained. Then 20 parts (on the amount of polymer in solution) of sulfur monochloride were added, and the mixture was refluxed for about 10 minutes at a temperature of about 85° C. During this refluxing treatment a substantial quantity of hydrogen chloride was evolved and driven out from the solution. At the end of the 10 minutes of refluxing, the reflux condenser was removed and a standard condenser substituted, and the unreacted sulfur chloride and naphtha were distilled off, leaving behind a solid residue of the sulfur chloride treated polymer. The solid polymer was then compounded according to the following formula:

| | Parts |
|---|---|
| Sulfur chloride treated polymer | 100 |
| Zinc oxide | 5 |
| Stearic acid | 5 |
| Sulfur | 3 |
| Tuads (tetra methyl thiuram disulfide) | 1 |

This compound was prepared upon the open rolls by first milling the sulfur-monochloride-treated polymer until a good plasticity was obtained at a temperature of approximately 120° C. Then the zinc oxide, the stearic acid and the sulfur were added. The mill was then cooled to about 80° C. and the Tuads added rapidly. The compound was then removed from the mill and thereafter cured by heating to a temperature of 155° C. for approximately 60 minutes.

The sulfur chloride treated polymer, either as such, or when compounded, showed a substantial thermoplasticity, sufficient to permit the complete and satisfactory filling of a mould, and after the curing step, the cured material was markedly superior in abrasion resistance, and in flexure resistance, and highly resistant to sunlight and ultra-violet light, and more resistant to chemical reagents, oils and solvents generally than is rubber, and the modulus of elasticity was markedly increased; (that is the stress-strain curve is more nearly perpendicular) and a product having approximately the same tensile strength as the untreated but cured polymer is obtained.

It is obvious that no single stress-strain relationship inherent in a product would be optimum for all or even a major portion of the uses to which that product might be put. By the application of the present invention, it is now possible to obtain modulus characteristics in conformity with the demands of a particular need and this greatly extends the range of application of the isoolefin-diolefin polymers.

Example II

In this embodiment of the invention, a portion of the low temperature polymer prepared as above described was dissolved in petroleum naphtha in the proportion of approximately 20%. This solution was a thick, viscous fluid. There was then added to this fluid approximately 10% by weight (on the amount of polymer in solution) of sulfur monochloride, and the mixture was well stirred. It was then heated under a reflux condenser for approximately 15 minutes at a temperature of approximately 95° C. At the end of 15 minutes of refluxing, the reaction vessel was attached to a distilling unit and the sulfur chloride and naphtha flashed off under a vacuum. On treating the sulfur chloride polymer as in Example I, similar characteristics were obtained.

Example III 100 parts of a similar polymer of isobutylene with butadiene were cut into small pieces and suspended in 800 parts of petroleum naphtha and allowed to stand until the polymer was well dispersed or dissolved in the naphtha. 12 parts of sulfur monochloride were then added, and the mixture was refluxed at 90° C. for 20 minutes until no further hydrogen chloride was evolved. The naphtha and sulfur chloride were stripped off by distillation under a vacuum, leaving the solid sulfur monochloride treated polymer. The solid sulfur monochloride treated polymer was then sheeted out on a roll mill and compounded as above described, to yield an improved modulus.

As above pointed out, varying amounts of the sulfur chloride may be added, and variations in the change of modulus obtained thereby.

*Example IV*

It is not necessary that the polymer be dissolved or dispersed in an inert solvent. Instead, the sulfur monochloride or sulfur dichloride itself may be used. Similarly, other solvents such as carbon tetrachloride, toluene, benzene and other hydrocarbon solvents may be employed.

100 parts of isobutylene-butadiene interpolymer, as above described, were cut into small fragments and suspended in 500 parts of sulfur monochloride at room temperature. The polymer dissolved or dispersed at good speed. The material was then rapidly heated and the excess sulfur monochloride rapidly distilled off, together with a substantial quantity of hydrogen chloride. The resulting solid polymer was compounded according to the above formula in Example I and found to show a similarly increased modulus with relatively little loss in tensile strength. In some instances the effect of the sulfur monochloride is undesirably greater and the effect of the reaction may be controlled and reduced by distillation under a vacuum, the vacuum serving to control the reaction temperature and the rate of distillation of the sulfur monochloride.

*Example V*

Also it is not necessary that a highly volatile solvent be used. A heavier solvent may be used and the polymers separated by precipitation with an oxygenated carbonaceous solvent.

100 parts of the isobutylene-butadiene interpolymer, above described, were cut into small fragments and suspended in 800 parts of heavy naphtha. The polymer dissolved or dispersed with reasonable speed. 12 parts of sulfur monochloride were then added to the solution and the mixture was refluxed at 90° C. for 20 minutes until no further hydrogen chloride was evolved. The excess sulfur chloride, and residual traces of hydrogen chloride, were stripped off by heating over a vacuum, leaving a solution and dispersion of the sulfur chloride treated polymer in the heavy naphtha. The solid sulfur chloride treated polymer was then separated from the heavy naphtha by the addition of approximately 100 parts of isopropyl alcohol (any oxygenated carbonaceous solvent could have been used including any of the alcohols up to about 8 carbon atoms, any of the ketones or alkyl dehydrates up to about the same carbon atom number, or the lower organic acids, or alkyls or the like). The solid sulfur-monochloride-treated polymer precipitated from the heavy naphtha solution was treated free from naphtha, washed briefly with alcohol then sheeted out on a roll mill and compounded as above described to yield an improved modulus along with the other desirable characteristics of the treated polymer as above described.

The reactions involved in the preparation and use of this composition are as yet unknown. It is, however, known that the reaction of the polymer with sulfur chloride is greatly different from the reaction of rubber with sulfur chloride since sulfur chloride is a standard vulcanization agent for rubber and rubber when treated with sulfur chloride is completely vulcanized. This, however, is not the case with the polymer, since it still contains unsaturation which permits further curing after the sulfur chloride treatment and also the sulfur chloride treated polymer is still plastic and can still be worked on the mill; still has a considerable amount of cold flow and is capable of flowing to fill the contours of a mold upon heating, even though the sulfur chloride has been absorbed into the polymer and combined therewith.

Applicants' present opinion is that the sulfur chloride removes a portion of the hydrogen from the polymer without reducing the unsaturation. It is believed at the present time that in the preparation of the polymer a long chain molecule is obtained in which the unsaturation of all of the isobutylene molecules except a terminal molecule, disappears and in which the diolefin molecules are polymerized into the chain with the loss of one of the double bonds as shown in the following formula:

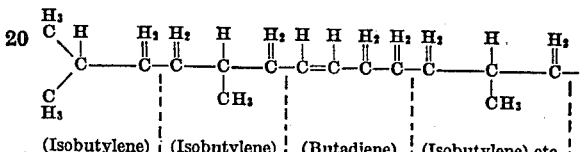

(Isobutylene) (Isobutylene) (Butadiene) (Isobutylene) etc.

It is believed that this chain structure builds up until molecular weights of from 15,000 to 150,000 are obtained.

It is further believed that when the sulfur chloride treatment is applied, both the sulfur and chlorine are adsorbed into the molecule by the double bonds in two different molecules as shown in the following equation:

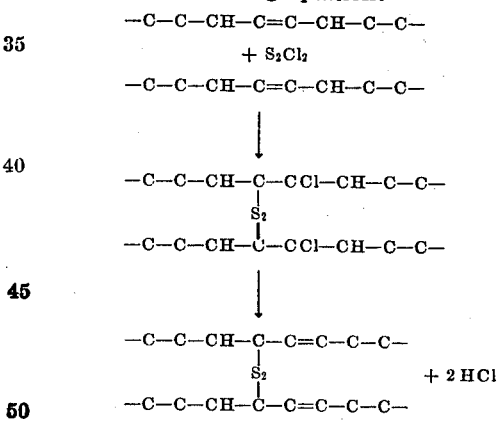

It will be observed that hydrogen chloride is eliminated by this reaction and that two of the chain molecules are linked together by a sulfur atom while retaining double bonds in each molecule in nearly the original position. It may well be that linkage by a single sulfur atom is different from the curing operation by sulfur. In any event, the material produced by this reaction is very different from the cured material. These equations are offered as a possible suggestion of the reaction and as a plausible reason for the differences obtained in the present process. They have not, however, been proved, and they are not offered as settled fact, nor is reliance placed upon them for explanation of the invention.

Thus, the invention consists of a new and useful process for improving the physical characteristics of an olefinic interpolymer by the application to the polymer in solution of a substantial percentage of a sulfur chloride, and the elimination of hydrogen chloride from the polymer to produce a material which is capable of being compounded, milled and thereafter cured with sulfur at an elevated temperature to produce a material having an elastic limit, a tensile strength, a high elongation, a high abrasion resistance and a high flexure resistance.

While there are above disclosed but a limited number of embodiments of the process and composition of the invention, it is possible to produce still other embodiments without departing from the inventive concept herein disclosed, and it is therefore desired that only such limitations be imposed upon the appended claims as are stated therein or required by the prior art.

The invention claimed is:

1. In the processing of a synthetic, solid, plastic hydrocarbon interpolymer of a major proportion of an iso-olefin having not more than about seven carbon atoms per molecule with a minor proportion of a conjugated diolefin having 4 to 6, inclusive, carbon atoms per molecule, the said interpolymer being characterized by an iodine number between 1 and 45, a molecular weight above 15,000 and reactivity with sulfur to yield an elastic product, the step of heating a solution of the said interpolymer with a sulfur chloride to a reaction temperature causing evolution of hydrogen chloride to produce a partly sulfurized polymer which is millable to plasticity and is reactive with elemental sulfur to yield an elastic product.

2. In the processing of a synthetic, solid, plastic hydrocarbon interpolymer of a major proportion of isobutylene with a minor proportion of a conjugated diolefin having 4 to 6, inclusive, carbon atoms per molecule, the said interpolymer being characterized by an iodine number between 1 and 45, a molecular weight above 15,000 and reactivity with sulfur to yield an elastic product, the step of heating a solution of the said interpolymer in a petroleum naphtha with a sulfur chloride to a reaction temperature causing evolution of hydrogen chloride, to produce a partly sulfurized polymer which is millable to plasticity and is reactive with elemental sulfur to yield an elastic product, and separating said partly sulfurized polymer from said petroleum naphtha.

3. Process according to claim 2, in which said sulfur chloride is sulfur monochloride.

4. In the processing of a synthetic, solid, plastic hydrocarbon interpolymer of a major proportion of isobutylene with a minor proportion of a conjugated diolefin having 4 to 6, inclusive, carbon atoms per molecule, the said interpolymer being characterized by an iodine number between 1 and 45, a molecular weight above 15,000 and reactivity with sulfur to yield an elastic product, the step of heating a solution of the said interpolymer in an excess of a sulfur chloride to a reaction temperature causing evolution of hydrogen chloride to produce a partly sulfurized polymer which is millable to plasticity and is reactive with elemental sulfur to yield an elastic product, and thereafter separating the partly sulfurized polymer from the excess sulfur chloride.

5. Process according to claim 4, in which the said chloride is sulfur monochloride.

6. In the processing of a synthetic, solid, plastic hydrocarbon interpolymer of a major proportion of an iso-olefin having not more than about seven carbon atoms per molecule with a minor proportion of a conjugated diolefin having 4 to 6, inclusive, carbon atoms per molecule, the said interpolymer being characterized by an iodine number between 1 and 45, a molecular weight above 15,000 and reactivity with sulfur to yield an elastic product, the steps of heating a solution of the said interpolymer with a sulfur chloride to a reaction temperature causing evolution of hydrogen chloride to produce a partly sulfurized polymer milling the partly sulfurized polymer to plasticity, and thereafter heating this polymer with added elemental sulfur and a sulfurization aid to produce a vulcanized, elastic polymer of improved modulus.

7. In the processing of a synthetic, solid, plastic hydrocarbon interpolymer of a major proportion of isobutylene with a minor proportion of a conjugated diolefin having 4 to 6, inclusive, carbon atoms per molecule, the said interpolymer being characterized by an iodine number between 1 and 45, a molecular weight above 15,000 and reactivity with sulfur to yield an elastic product, the steps of heating a solution of the said interpolymer with a sulfur chloride to a reaction temperature causing evolution of hydrogen chloride to produce a partly sulfurized polymer milling the partly sulfurized polymer to plasticity, and thereafter milling the said partly sulfurized polymer with a minor proportion of a pigment and loading agent, elemental sulfur and a sulfurization agent and heating the milled product to produce a vulcanized, elastic product of improved modulus.

WILLIAM J. SPARKS.
HENRY B. KELLOG.

REFERENCES CITED

The following references are of record in the file of this patent:

UNITED STATES PATENTS

| Number | Name | Date |
|---|---|---|
| 2,138,895 | Wiezevich, 1 | Dec. 6, 1938 |
| 2,213,423 | Wiezevich, 2 | Sept. 3, 1940 |
| 2,023,495 | Thomas, 1 | Dec. 10, 1939 |
| 2,152,828 | Thomas, 2 | Apr. 4, 1939 |
| 2,142,980 | Huijser | Jan. 3, 1939 |

FOREIGN PATENTS

| Number | Country | Date |
|---|---|---|
| 6,642 | British | 1911 |
| 513,521 | British | Oct. 16, 1939 |